(12) United States Patent
Packer et al.

(10) Patent No.: US 10,799,980 B2
(45) Date of Patent: Oct. 13, 2020

(54) COMPRESSIBLE FRICTION STIR WELDING TOOL FOR CONVENTIONAL MACHINING EQUIPMENT

(71) Applicant: Mazak Corporation, Florence, KY (US)

(72) Inventors: Scott M. Packer, Alpine, UT (US); Rodney Dale Fleck, Draper, UT (US); Russell J. Steel, Salem, UT (US)

(73) Assignee: Mazak Corporation, Florence, KY (US)

( * ) Notice: Subject to any disclaimer, the term of this patent is extended or adjusted under 35 U.S.C. 154(b) by 310 days.

(21) Appl. No.: 15/719,731

(22) Filed: Sep. 29, 2017

(65) Prior Publication Data

US 2018/0099349 A1    Apr. 12, 2018

Related U.S. Application Data

(60) Provisional application No. 62/404,932, filed on Oct. 6, 2016.

(51) Int. Cl.
*B23K 20/12*    (2006.01)

(52) U.S. Cl.
CPC .................. *B23K 20/1255* (2013.01)

(58) Field of Classification Search
CPC .......................... B23K 20/122; B23K 20/1255
See application file for complete search history.

(56) References Cited

U.S. PATENT DOCUMENTS

| | | | | |
|---|---|---|---|---|
| 2,571,035 A * | 10/1951 | Hastings | ................. | F16J 15/38 277/385 |
| 4,460,186 A * | 7/1984 | Hildebrand | ............. | B60G 3/01 15/83 |
| 5,275,421 A * | 1/1994 | Hornsby | ............. | F16J 15/3464 277/370 |
| 5,718,366 A * | 2/1998 | Colligan | ............. | B23K 20/125 156/580 |
| 5,795,231 A * | 8/1998 | Fukuda | ..................... | F16F 1/04 267/167 |
| 6,305,693 B1 * | 10/2001 | Wehrle | ................. | F16J 15/3452 277/370 |
| 6,648,206 B2 | 11/2003 | Nelson | | |
| 6,732,901 B2 | 5/2004 | Nelson | | |

(Continued)

FOREIGN PATENT DOCUMENTS

| | | | | |
|---|---|---|---|---|
| EP | 2085168 A2 * | 8/2009 | ........... | B23K 20/125 |
| JP | 11197856 A * | 7/1999 | ........... | B23K 20/123 |

(Continued)

OTHER PUBLICATIONS

U.S. Appl. No. 60/573,703, filed May 24, 2014, 6 pages.

*Primary Examiner* — Erin B Saad
*Assistant Examiner* — Carlos J Gamino
(74) *Attorney, Agent, or Firm* — Fitch, Even, Tabin & Flannery LLP

(57) ABSTRACT

A tool includes a friction stir welding (FSW) tool, a first body, a second body, and a plurality of biasing elements. The FSW tool has a rotational axis. The first body is rotationally fixed relative to the FSW tool and the second body is rotational fixed relative to the FSW tool. The plurality of biasing elements is positioned longitudinally between at least a portion of the first body and at least a portion of the second body.

17 Claims, 12 Drawing Sheets

(56) References Cited

U.S. PATENT DOCUMENTS

| | | |
|---|---|---|
| 6,779,704 B2 | 8/2004 | Nelson |
| 7,124,929 B2 | 10/2006 | Nelson |
| 7,152,776 B2 | 12/2006 | Nelson |
| 1,182,179 A1 | 6/2007 | Packer |
| 7,225,968 B2 | 6/2007 | Packer |
| 7,270,257 B2 | 9/2007 | Steel |
| 1,239,203 A1 | 2/2009 | Babb |
| 7,494,040 B2 | 2/2009 | Babb |
| 7,530,486 B2 | 5/2009 | Flak |
| 7,608,296 B2 | 10/2009 | Packer |
| 7,651,018 B2 | 1/2010 | Packer |
| 7,661,572 B2 | 2/2010 | Nelson |
| 7,681,705 B2 * | 3/2010 | Okada ............... F16D 13/04 192/54.5 |
| 7,753,252 B2 | 7/2010 | Taylor |
| 7,845,545 B2 | 12/2010 | Packer |
| 7,909,231 B2 | 3/2011 | Babb |
| 7,992,759 B2 | 8/2011 | Steel |
| 7,993,575 B2 | 8/2011 | Nelson |
| 8,056,797 B2 | 11/2011 | Packer |
| 8,157,154 B2 | 4/2012 | Packer |
| 8,186,561 B2 | 5/2012 | Allen |
| 8,241,556 B2 | 8/2012 | Rosal |
| 8,302,834 B2 | 11/2012 | Nelson |
| 8,317,080 B2 | 11/2012 | Kingston |
| 8,469,256 B2 | 6/2013 | Babb |
| 8,490,855 B2 | 7/2013 | Kingston |
| 8,550,326 B2 | 10/2013 | Packer |
| 8,910,851 B2 | 12/2014 | Rosal |
| 8,955,734 B2 | 2/2015 | Steel |
| 9,061,370 B2 | 6/2015 | Nelson |
| 9,061,371 B2 | 6/2015 | Higgins |
| 9,095,926 B2 * | 8/2015 | Okada ............... B23K 20/1265 |
| 9,242,308 B2 | 1/2016 | Peterson |
| 9,352,425 B2 | 5/2016 | Rosal |
| 9,457,513 B2 * | 10/2016 | Hutsch ............... B23K 20/1255 |
| 9,764,375 B2 | 9/2017 | Miles |
| 1,640,190 A1 | 5/2019 | Liu |
| 1,640,735 A1 | 5/2019 | Miles |
| 10,279,422 B2 * | 5/2019 | Werz ............... B23K 20/1255 |
| 2003/0075584 A1 | 4/2003 | Sarik |
| 2005/0006439 A1 | 1/2005 | Packer |
| 2005/0051602 A1 | 3/2005 | Babb |
| 2005/0142005 A1 | 6/2005 | Traylor |
| 2006/0032333 A1 | 2/2006 | Steel |
| 2006/0032891 A1 | 2/2006 | Flak |
| 2006/0049234 A1 | 3/2006 | Flak |
| 2006/0157531 A1 | 7/2006 | Packer |
| 2006/0175382 A1 | 8/2006 | Packer |
| 2007/0187465 A1 | 8/2007 | Eyre |
| 2008/0029578 A1 | 2/2008 | Steel |
| 2008/0296350 A1 * | 12/2008 | Henneboehle ..... B23K 20/1245 228/112.1 |
| 2009/0294514 A1 | 12/2009 | Babb |
| 2010/0071961 A1 | 3/2010 | Steel |
| 2010/0078224 A1 | 4/2010 | Steel |
| 2011/0127311 A1 | 6/2011 | Peterson |
| 2011/0172802 A1 | 7/2011 | Babb |
| 2012/0055977 A1 | 3/2012 | Steel |
| 2012/0227546 A1 | 9/2012 | Allen |
| 2012/0273555 A1 | 11/2012 | Flak |
| 2013/0062395 A1 | 3/2013 | Nelson |
| 2013/0206818 A1 | 8/2013 | Higgins |
| 2013/0228612 A1 | 9/2013 | Higgins |
| 2013/0299561 A1 | 11/2013 | Higgins |
| 2014/0008418 A1 | 1/2014 | Steel |
| 2014/0151438 A1 | 6/2014 | Fleck |
| 2014/0326392 A1 * | 11/2014 | Silvanus ............ B23K 20/1255 156/73.5 |
| 2014/0367452 A1 * | 12/2014 | Dinda ............... B23K 20/122 228/112.1 |
| 2015/0258628 A1 | 9/2015 | Flak |
| 2016/0008918 A1 * | 1/2016 | Burford ............ B23K 20/1255 228/112.1 |
| 2016/0074957 A1 * | 3/2016 | Nishida ............ B23K 37/0235 228/114.5 |
| 2017/0197274 A1 | 7/2017 | Steel |
| 2017/0216961 A1 | 8/2017 | Utter |
| 2019/0061046 A1 | 2/2019 | Fleck |
| 2019/0061048 A1 * | 2/2019 | Fleck ............... B23K 20/123 |
| 2019/0151982 A1 | 5/2019 | Rosal |

FOREIGN PATENT DOCUMENTS

| | | | | |
|---|---|---|---|---|
| JP | 2000202647 A | * | 7/2000 | ........ B23K 20/1245 |
| JP | 2002192359 A | * | 7/2002 | |
| JP | 2003260572 A | * | 9/2003 | |
| JP | 2014061543 A | * | 4/2014 | ........ B23K 20/125 |
| WO | WO-2006081819 A1 | * | 8/2006 | ........ B23K 20/126 |
| WO | WO-2009056759 A3 | * | 6/2009 | ........ B23K 20/1255 |

\* cited by examiner

COMPRESSIBLE FRICTION STIR WELDING TOOL FOR CONVENTIONAL MACHINING EQUIPMENT

CROSS-REFERENCE TO RELATED APPLICATIONS

This application claims priority to and the benefit of U.S. Provisional Patent Application No. 62/404,932, filed on Oct. 6, 2016, which is hereby incorporated by reference in its entirety.

BACKGROUND

This section provides background information to facilitate a better understanding of the various aspects of the disclosure. It should be understood that the statements in this section of this document are to be read in this light, and not as admissions of prior art.

Friction Stir Welding (FSW) sometimes referred to as Friction Stir Joining (FSJ) is a solid-state material joining process. The technology was developed to join aluminum and later tool materials and processes for joining ferrous materials and other high melting temperature materials. FSW was a superior method to join aluminum over conventional welding methods that melted a filler metal along with the aluminum for a diffusion bond. Fusion welding technologies with cast microstructures do not yield the superior mechanical or material properties as wrought FSW joints. Mechanical and material properties of solid state FSW joints have been well documented in literature along with FSW tool geometries, equipment and operations parameters.

FSW is a thermo-mechanical process. During development of FSW, researchers identify machine loads or forces, tool loads, temperatures, fixturing to hold materials, and other process variables. This data is used to thoroughly understand the FSW process. These process variables are identified with specially developed computer controlled FSW machines. As the dedicated FSW machines are large and expensive, large companies and individual governments provided financing to their respective research organizations to develop the technology and reduce it to practice. Military, transportation and aerospace companies that used aluminum extensively invested heavily in equipment, people and payment of exorbitant royalties to TWI. The applications (mostly aluminum) that came forth from this development work include, bullet trains, space shuttle boosters, commercial jet components, ship decking, heat exchangers, and other components.

A FSW machine rotates a tool that is programmed to move material at a specified location, feed rate, rotating speed, and tool path. The tool's feed rate and depth of cut must be programmed, according to a machining knowledge base, to move at parameters that prevent excessive force to the tool or machine. In addition to maintaining tool position and feed rates, FSW machines must also be programmed to control tool loads. Commonly, the FSW machine controls a downward or Z axis force on the tool as it traverses the joint being friction stir welded. More sophisticated FSW control systems incorporate a controlled force on other tool axis within a position window.

SUMMARY

In an embodiment, a tool includes a friction stir welding (FSW) tool, a first body, a second body, and a plurality of biasing elements. The FSW tool has a rotational axis. The first body is rotationally fixed relative to the FSW tool and the second body is rotational fixed relative to the FSW tool. The plurality of biasing elements is positioned longitudinally between at least a portion of the first body and at least a portion of the second body.

In another embodiment, a friction stir welding system includes a computer number controlled (CNC) milling device, a FSW tool, and a load head adapter. The CNC milling device has a tool holder moveable at least in a longitudinal direction and rotatable about a rotational axis. The FSW tool is rotatable about the rotational axis. The load head adapter includes a first body, a second body, and a plurality of biasing elements. The first body is rotationally fixed relative to the FSW tool and the second body is rotational fixed relative to the FSW tool. The plurality of biasing elements is positioned longitudinally between at least a portion of the first body and at least a portion of the second body.

In yet another embodiment, a method of friction stir welding a workpiece includes contacting a workpiece with a FSW tool having a rotational axis and displacing the FSW tool in a first longitudinal direction a first distance. The method further includes compressing at least one biasing element of a plurality of biasing elements of the load head the first distance and applying a restorative force to the FSW tool in an opposing second longitudinal direction with the at least one biasing element.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a side cross-sectional view of the embodiment of a load head of FIG. 2, according to some embodiments of the present disclosure;

FIG. 3-2 is a side cross-sectional view of the embodiment of a load head of FIG. 2 in a compressed state, according to some embodiments of the present disclosure;

DETAILED DESCRIPTION

Some embodiments of the present disclosure relate generally to friction stir welding (FSW) of two or more workpieces. More particularly, some embodiments relate to conducting FSW with FSW tool adapted to work with a computer numerical control (CNC) milling device. In some further embodiments, the FSW tool is a load head that applies a known axial load based on compression of the load head.

Figure 1:
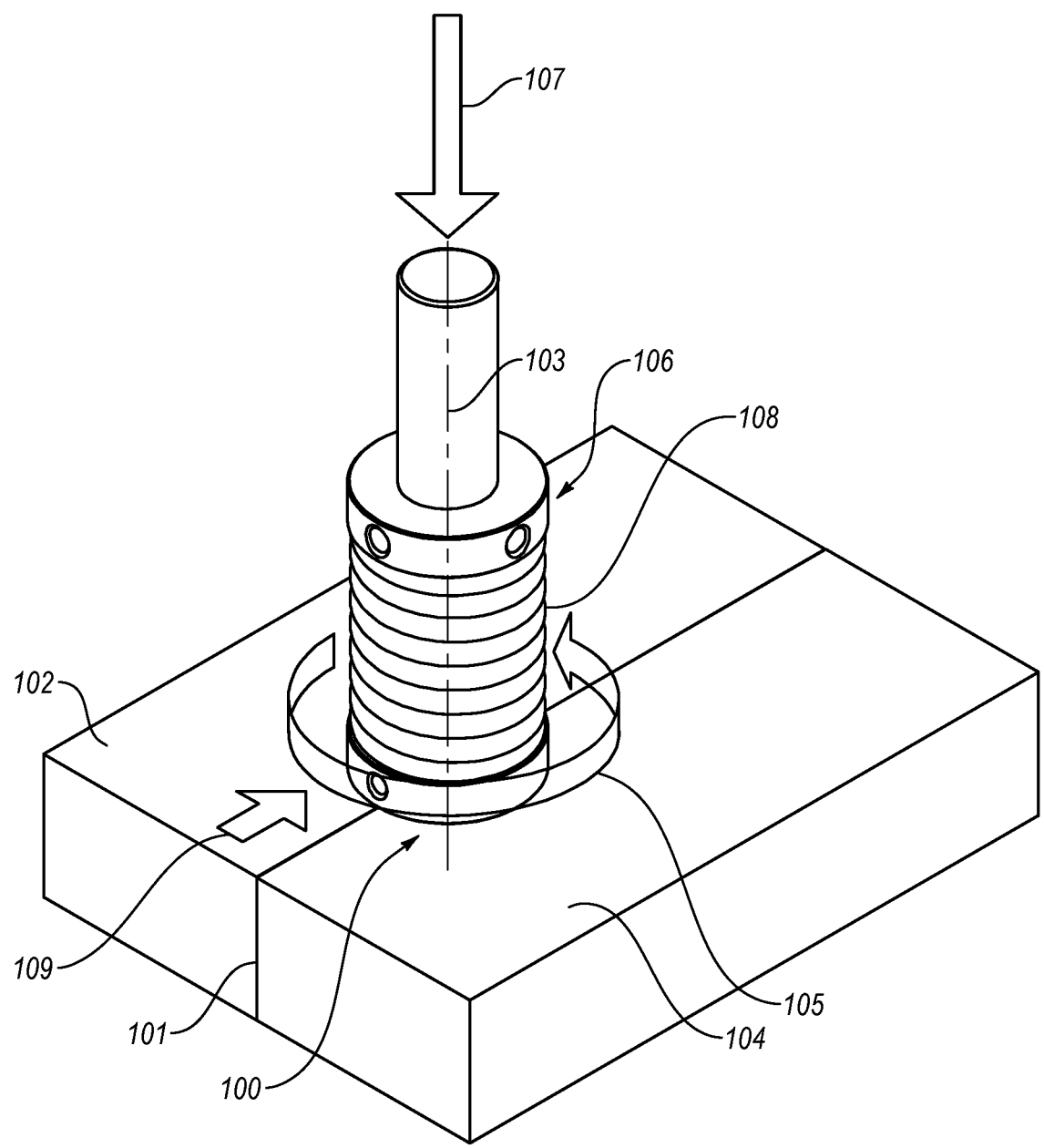
FIG. 1 is a schematic diagram of an embodiment of a friction stir welding (FSW) system welding workpieces, according to some embodiments of the present disclosure.

FIG. 1 illustrates an embodiment of a FSW tool 100 joining a first workpiece 102 and a second workpiece 104 along a butt joint 101. While FSW joints will be described herein in reference to butt joints, it should be understood that one or more systems, tools, or methods according to the present disclosure may be used to join a first workpiece 102 and a second workpiece 104 in a butt joint, a lap joint, an angled joint, a non-linear joint, or any other joint having contacting surfaces of the first workpiece 102 and second workpiece 104. FSW tool 100 rotates about a longitudinal axis 103 of the FSW tool 100 in a rotational direction 105 to generate frictional heat in the FSW tool 100 and the first workpiece 102 and second workpiece 104 to plasticize and move the material of the first workpiece 102 and second workpiece 104. The FSW tool 100 applies a downward force 107 toward the first workpiece 102 and second workpiece 104 to plunge at least part of the FSW tool 100 into the first workpiece 102 and second workpiece 104 along the joint. The FSW tool 100 can also apply a transverse force 109 to move the FSW tool 100 across the surface of the first workpiece 102 and second workpiece 104 along the joint.

The plunge depth of the FSW tool 100 relative to an upper surface of the first workpiece 102 and second workpiece 104 along the joint affects the quality of the weld. If the material is thicker in one portion of the weld, excess flash is generated as the FSW tool 100 over plunges while thinner material does not allow full penetration of the FSW tool 100 and weld defects are created. Some conventional CNC mill or milling devices can control positioning of a tool holder and associated tool in at least three axes and rotate the tool holder about at least one axis, but cannot measure axial load forces or position of the tool holder and/or tool relative to an upper surface of the first workpiece 102 and second workpiece 104. Other conventional CNC milling devices measure the axial load forces but may lack the control capability to adjust the z-axis position and/or axial load of the tool holder in response to material changes. A FSW load head 106 according to the present disclosure includes a biasing element 108 that applies an axial force 107 to the FSW tool 100. The axial force 107 is at least partially dependent upon the axial compression of the biasing element 108. The compression of the biasing element 108 allows a CNC milling device without axial load measurement and/or axial load control to apply a known axial load 107 and adjust FSW tool 100 depth dynamically.

In some embodiments, the FSW tool 100 may include or be made of an ultrahard material. As used herein, the term "ultrahard" is understood to refer to those materials known in the art to have a grain hardness of about 1,500 HV (Vickers hardness in $kg/mm^2$) or greater. Such ultra-hard materials can include those capable of demonstrating physical stability at temperatures above about 750° C., and for certain applications above about 1,000° C., that are formed from consolidated materials. Such ultrahard materials can include but are not limited to diamond, polycrystalline diamond (PCD), leached metal catalyst PCD, non-metal catalyst PCD, hexagonal diamond (Lonsdaleite), cubic boron nitride (cBN), polycrystalline cBN (PcBN), binderless PCD or nanopolycrystalline diamond (NPD), Q-carbon, binderless PcBN, diamond-like carbon, boron suboxide, aluminum manganese boride, metal borides, boron carbon nitride, and other materials in the boron-nitrogen-carbon-oxygen system which have shown hardness values above 1,500 HV, as well as combinations of the above materials. In at least one embodiment, the FSW tool 100 may include a monolithic PCD. In some embodiments, the ultrahard material may have a hardness values above 3,000 HV. In other embodiments, the ultrahard material may have a hardness value above 4,000 HV. In yet other embodiments, the ultrahard material may have a hardness value greater than 80 HRa (Rockwell hardness A). In other embodiments, the FSW tool 100 may include or be made of a material with a grain hardness less than about 1,500 HV. For example, a FSW tool 100 including or made of tool steel may effectively FSW a first workpiece 102 and a second workpiece 104 comprising aluminum. In at least one embodiment, the FSW tool 100 includes or is made of a material having a hardness greater than the material of the first workpiece 102 and/or the second workpiece 104.

Figure 2:
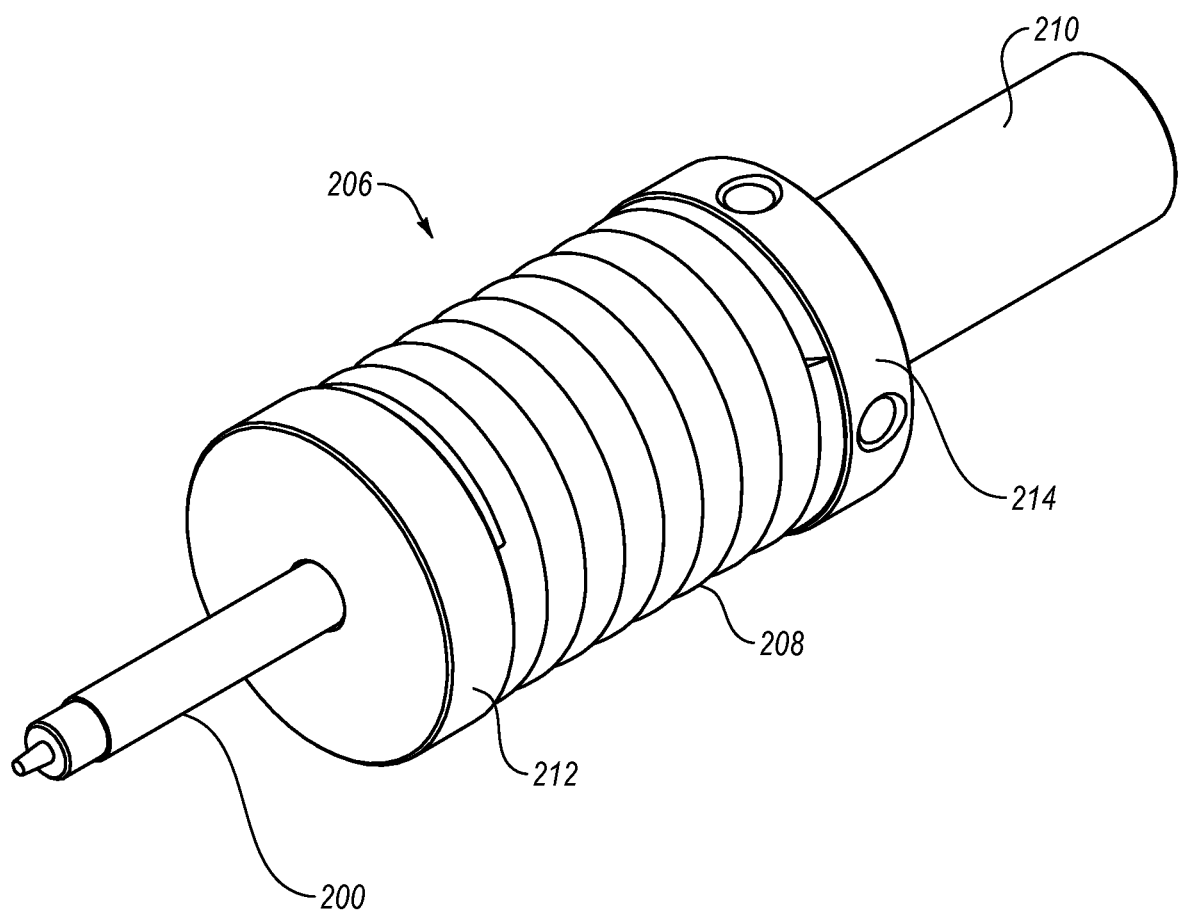
FIG. 2 is a perspective view of an embodiment of a load head, according to some embodiments of the present disclosure.

Referring now to FIG. 2, in some embodiments, a load head 206 includes a biasing element 208 positioned between a tool holder connector and a FSW tool 200. An example of a tool holder connector is an arbor 210 for a CNC tool holder shown in FIG. 2. The biasing element 208 may resist compression and, upon compression, bias the FSW tool 200 away from the arbor 210. The biasing element 208 may, thereby, apply an axial force downward to the FSW tool 200 based at least partially upon the compression of the biasing element 208.

The load head 206 may include a first body and a second body that are longitudinally moveable relative to one another. Movement of the first body and the second body may compress the biasing element 208. In some embodiments, the first body of the load head 206 may include a piston 212 and the second body of the load head 206 may include a cylinder 214. The piston 212 and cylinder 214 are axially movable relative to one another. At least a portion of the piston 212 and at least a portion of the cylinder 214 may longitudinally overlap (see FIG. 3). The cylinder 214 may circumferentially surround at least a portion of the piston 212, although in other embodiments the piston 212 may circumferentially surround at least a portion of the cylinder 214, or other configurations may be used. In some embodiments, the biasing element 208 may be positioned between at least a portion of the piston 212 and at least a portion of the cylinder 214.

In FIG. 2, for instance, the biasing element 208 is positioned longitudinally between annular shoulder portions of the piston 212 and the cylinder 214 such that opposing ends of the biasing element 208 abut the piston 212 and cylinder 214, respectively. Moving the piston 212 and cylinder 214 toward one another may compress the biasing element 208. For example, movement or other displacement of at least a portion of the piston 212 and cylinder 214 toward one another may move or otherwise displace the opposing ends of the biasing element 208 toward one another. In other words, compressing the ends of the piston 212 and the cylinder 214 toward one another may compress the biasing element 208.

While the present disclosure described an embodiment of a load head 206 having a piston 212 and cylinder 214, it should be understood that the first body and second body may be any two mechanical elements that engage, interlock, or cooperate and allow a longitudinal degree of freedom. For example, the first body and second body may include a plurality of splines, rails, posts, or other engagement members to allow longitudinal movement and optionally limiting and/or preventing transverse and/or rotational movement.

The biasing element 208 may apply an expansive force to the piston 212 and cylinder 214 in response to compression. The biasing element 208 may generate a reactive restorative force opposing the compression of the biasing element 208 that is based at least partially upon the amount of displacement of the piston 212 and cylinder 214 (i.e., the ends of the biasing element 208). In some embodiments, the restorative force generated by the biasing element 208 may correspond to Hooke's Law:

$$F=-kx$$

where F is the restorative force generated by the biasing element 208, k is the spring constant of the biasing element 208, and x is the longitudinal displacement of the ends of the biasing element 208.

For example, the axial displacement of the biasing element 208 can be controlled by the z-axis control of a CNC milling device. As an example, the load head 206 may use a biasing element 208 with a spring constant of 1,000 lbf (4.45 kN) for each 1.0 inch (25.4 mm) of displacement or 1 lbf (4.45 N) for every 0.001 inch (0.0254 mm). Therefore, a force of 631 lbf (2.8 kN) is achieved by programming the z-axis position of the tool holder an extra 0.631 inch (16 mm). In other words, the tool load may be determined by the z-axis position of the tool holder and the associated compression of the load head 206. Since material thickness variation is small relative to the spring displacement that occurs during FSW, total load variation is small. The FSW tool 200 follows the workpiece surface with an instantaneous load response whereas a conventional FSW machine's load response is delayed by the computational and system response.

In other embodiments, the restorative force provided by the biasing element 208 may be non-linear and may respond to displacement according to:

$$F=-k^n x^y$$

where F is the restorative force generated by the biasing element 208, k is a response constant of the biasing element 208, x is the longitudinal displacement of the ends of the biasing element 208, and n and y are any real numbers to model the response curve of the biasing element 208. In some embodiments, one or more biasing elements may provide up to 10 tons of force (89 kN).

In some embodiments, the biasing element 208 includes a spring, such as a coil spring, as shown in FIG. 2. In some embodiments, the biasing element 208 may include a leaf spring, a Belleville spring, other types of springs, or combinations thereof. In other embodiments, the biasing element 208 may include a compressible fluid, such as a liquid, a gas, or combinations thereof. For example, a compressible fluid may be positioned within the piston 212 and cylinder 214 such that displacement of the piston 212 toward the cylinder 214 compresses the fluid, increasing the fluid pressure of the fluid. In yet other embodiments, the biasing element 208 may include a plurality of magnets that utilize the interaction of the magnetic fields to generate a restorative force. In further embodiments, the biasing element 208 may include or be a resilient solid, such as rubber, polyurethane, or other polymer. For example, the biasing element 208 may include or be one or more polymer bushings positioned longitudinally between at least part of the piston 212 and at least part of the cylinder 214. In yet further embodiments, the biasing element 208 may include a combination of the foregoing. For example, a spring, as shown in FIG. 2, may be coiled around a piston 212 and cylinder 214 with a compressible fluid positioned therein.

Figures 1, 3:
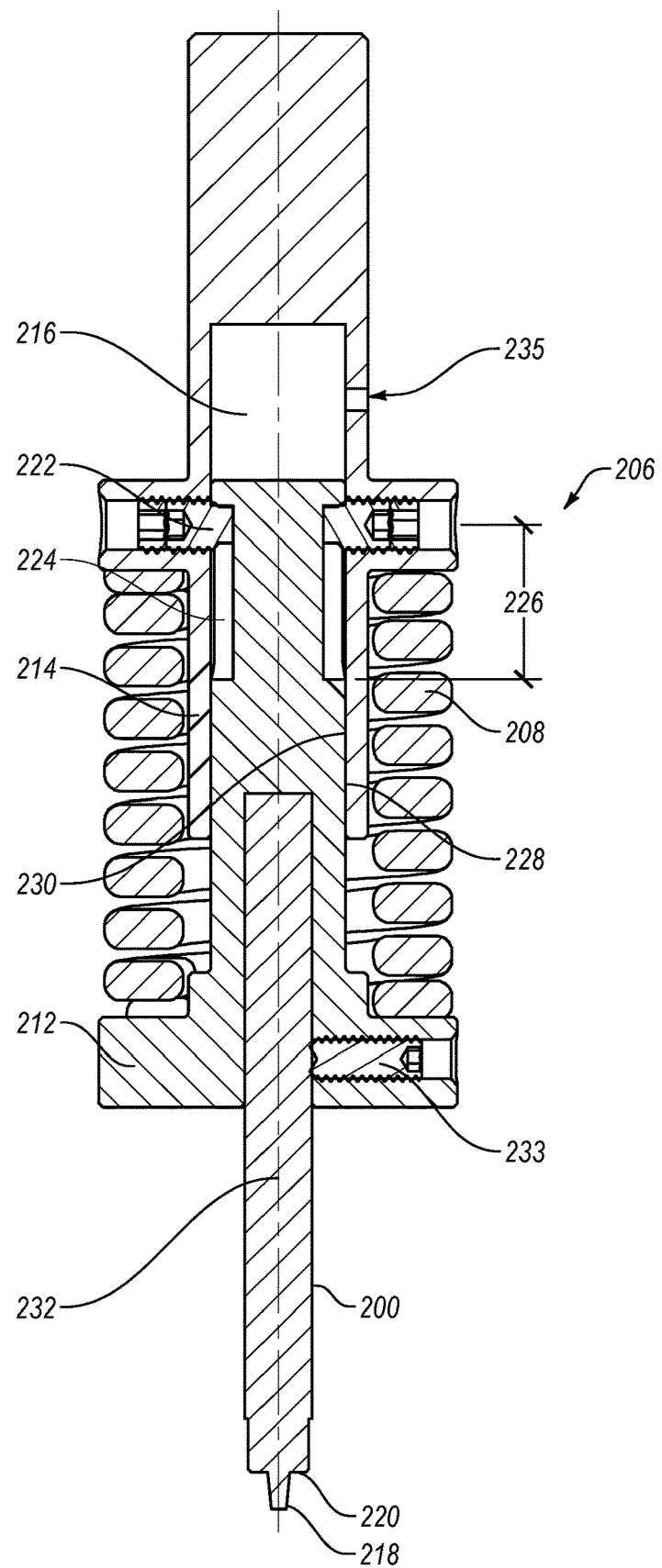
Figures 2, 3:
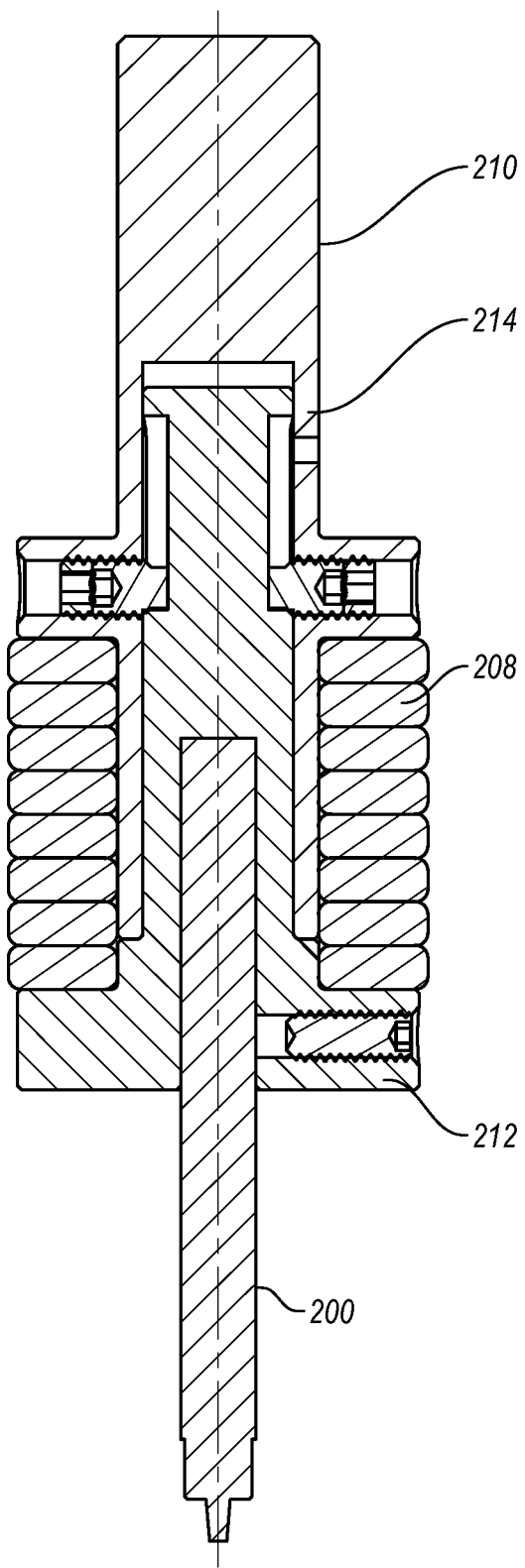

FIG. 3-1 is a side cross-sectional view of the embodiment of a load head 206 of FIG. 2. As shown in FIG. 3-1, the piston 212 and cylinder 214 may define a chamber 216 within the cylinder 214. In some embodiments, the cylinder 214 is continuous about the chamber 216. For example, the cylinder 214 may be devoid of openings or apertures therein, such that the chamber 216 is sealed. A sealed chamber 216 may allow a gas or other fluid (e.g., a compressible fluid) in the chamber 216 to pressurize under compression. In other embodiments, the cylinder 214 may have at least one optional pressure relief device 235 (e.g., a check valve or vent) to reduce the fluid pressure within the chamber 216.

In some embodiments, for example, the interaction between the FSW tool 200 and the first workpiece and/or second workpiece (e.g., workpieces 102, 104 of FIG. 1) may generate heat in the FSW tool 200. The heat may be conducted through the FSW tool 200 to the piston 212 and/or cylinder 214. The heat may increase the temperature of the fluid in the chamber 216, which may increase the fluid pressure in the chamber 216. To control the force applied by the load head 206 to the FSW tool 200 at a given longitudinal displacement, the fluid pressure within the chamber 216 may be controlled at least partially by a pressure relief device 235. Mechanical, electrical, electro-mechanical, or other control of the pressure relief device 235 may be used to provide precise control of the applied force.

In other embodiments, the load head 206 includes one or more thermal insulation members between the FSW tool and the biasing element 208 and/or the chamber 216. For example, the spring constant (k) of a spring, such as the biasing element 208 shown in FIG. 3-1, may vary with temperature. In particular, the elastic and plastic deformation regimes of the material(s) from which the biasing element 208 is made may change with temperature. The spring constant of a steel spring, for example, may decrease as the steel is heated.

In some embodiments, a thermal insulation layer between the FSW tool 200 and the biasing element 208 may increase the precision with which the axial force is applied by the biasing element 208 to the FSW tool 200. For example, the piston 212 may include or be a thermal insulation layer that resists the transmission of heat from the FSW tool 200 to the chamber 216 and/or cylinder 214. In other embodiments, the thermal insulation layer is positioned between the FSW tool 200 and the piston 212.

In other embodiments, the pin 218 and/or shoulder 220 of the FSW tool 200 may be longitudinally displaced from the first body (i.e., the piston 212). For example, the pin 218 and/or shoulder 220 of the FSW tool 200 may be longitudinally displaced from the first body to limit thermal conduction of heat from the FSW process to the biasing element. In other examples, the pin 218 and/or shoulder 220 of the FSW tool 200 may be longitudinally displaced from the first body to limit and/or prevent damage to the first body from flash or other debris from the FSW process.

In at least one embodiment, the FSW tool 200 is selectively coupleable to the load head 206. For example, the FSW tool 200 may be replaceable in the event that the FSW tool 200 is consumed during the FSW process or a pin 218 and/or shoulder 220 of the FSW tool 200 is damaged. A retention mechanism, such as the set screw 233 in the FIG. 3-1, may limit or prevent the movement of the FSW tool 200 relative to the piston 212 or other element of the load head 206 (e.g., relative rotational or axial movement). In other embodiments, the retention mechanism may include or be a clamp, bolt, pin, or other retention mechanism to limit or prevent movement of the FSW tool 200 relative to the piston 212 or other element of the load head 206.

In some embodiments, the piston 212 and the cylinder 214 are rotationally fixed relative to one another. For example, the piston 212 and the cylinder 214 may be rotationally fixed to one another by a mechanical fastener. For example, FIG. 3-1 illustrates a set screw 222 that is rotationally fixed to the cylinder 214 and radially advanceable into a recess 224 in the piston 212. The recess 224 may be a longitudinal groove that allows longitudinal movement of the set screw 222 within the recess 224. The recess 224 may have a rotational width that limits and/or prevents movement of the set screw 222 in the rotational direction relative to the recess 224. The recess 224 may, therefore, limit and/or prevent substantial angular or rotational movement of the set screw 222 relative to the piston 212. In other words, the interaction between the set screw 222 and the recess 224 may substantially limit and/or prevent the rotational movement of the piston 212 relative to the cylinder 214. In at least one embodiment, substantially fixing the piston 212 and cylinder 214 relative to one another in a rotational direction increases torque transmission through the piston 212 and cylinder 214 to the FSW tool 200. In at least one other embodiment, fixing the piston 212 and cylinder 214 relative to one another in a rotational direction reduces heat generation between the piston 212 and cylinder 214 during a FSW operation using the load head 206.

In other embodiments, the biasing element 208 may be rotationally fixed relative to the first body (e.g., the piston 212) and/or the second body (e.g., cylinder 214). Rotational fixation of the biasing element 208 relative to the piston 212 and/or cylinder 214 may limit heat generation between the biasing element 108 and the piston 212 and/or the cylinder 214. Additionally, rotational fixation of the biasing element 208 relative to the piston 212 and/or cylinder 214 may limit damage to one or more components of the load head 206 due to vibration or other lateral movement of the biasing element 108 and the piston 212 and/or the cylinder 214 relative to one another during use of the load head 206 during FSW processes.

The recess 224 may have a longitudinal length 226 that at least partially limits the axial movement of the piston 212 relative to the cylinder 214. For example, FIG. 3-1 illustrates the piston 212 and the cylinder 214 at or near the upper limit of the longitudinal displacement of the piston 212 and cylinder 214 apart from one another. The longitudinal length 226 of the recess 224 limits the movement of the piston 212 and the cylinder 214 in the longitudinal direction toward one another. In some embodiments, the longitudinal length 226 of the recess 224 limits the compression of the biasing element 208 to within a range of distances in which the biasing element 208 behaves according to a linear response model, as described herein.

In some embodiments, the travel of the piston 212 relative to the cylinder 214 in the longitudinal direction may be in a range having upper values, lower values, or upper and lower values including any of 0.5 inches (12.7 mm), 1.0 inches (25.4 mm), 1.5 inches (38.1 mm), 2.0 inches (50.8 mm), 2.5 inches (63.5 mm), 3.0 inches (76.2 mm), or any values therebetween. For example, the travel of the piston 212 relative to the cylinder 214 may be greater than 0.5 inches (12.7 mm). In other examples, the travel of the piston 212 relative to the cylinder 214 may be less than 3.0 inches (76.2 mm). In yet other examples, the travel of the piston 212 relative to the cylinder 214 may be between 0.5 inches (12.7 mm) and 3.0 inches (76.2 mm). In at least one embodiment, the set screw 222 or plurality of set screws 222 may allow at least some longitudinal displacement of the piston 212 and cylinder 214 relative to one another while limiting and/or preventing rotational displacement of the piston 212 and cylinder 214 relative to one another.

In the same or other embodiments, the piston 212 and cylinder 214 are rotationally fixed relative to one another with a mechanical interlock between the piston 212 and the cylinder 214. An outer surface 228 of the piston 212 may mechanically interlock with the inner surface 230 of the cylinder 214. For example, the transverse cross-sectional shape of the inner surface 230 of the cylinder 214 may be elliptical, irregularly curved, square, hexagonal, octagonal, other polygonal, irregular, or combinations thereof. The transverse cross-sectional shape of the outer surface 228 of the piston 212 may be complimentarily shaped to the transverse cross-sectional shape of inner surface 230 of the cylinder 214 such that the piston 212 mates with the cylinder 214 and can move longitudinally relative to the cylinder 214 with limited or no rotational freedom of movement relative to the cylinder 214. In the same or other embodiments, keys, pins, clamps, or other mechanical devices may also be used to rotationally fix the piston 212 relative to the cylinder 214.

While the piston 212 has been shown in contact with the FSW tool 200 and closer to the FSW tool 200 than the cylinder 214, it should be understood that the cylinder 214 and the piston 212 may be reversed or have other positions. For instance, the piston 212 may be positioned above the cylinder 214 (i.e., father from the FSW tool 200) and the cylinder 214 may be in contact with, and optionally releasably coupled to, the FSW tool 200.

FIG. 3-2 is a side cross-sectional view of an embodiment of the load head 206 of FIG. 3-1 in a compressed state. In some embodiments, the FSW tool 200 may contact one or more workpieces (see FIG. 1). An axial force may be applied to the arbor 210, for example, by a CNC machining device toward the FSW tool 200 (e.g., downward in the orientation shown in FIG. 3-2). At least a portion of the axial force on the arbor 210 may be transmitted from the arbor 210 to the FSW tool 200 through the biasing element 208. When the FSW tool 200 is in contact with a surface, such as a workpiece, the workpiece may exert an opposing axial force on the FSW tool 200 (e.g., upward in the orientation shown in FIG. 3-2). The axial force may be transmitted through the FSW tool 200 and the piston 212, to the biasing element 208. The biasing element 208 may therefore compress upon application of an axial load to the arbor 210. In at least one embodiment, the arbor 210 may transmit the axial load to a second body, such as the cylinder 214, and the second body may transmit at least a portion of the axial load to the biasing element 208, which may transmit at least a portion of the axial load to a first body, such as the piston 212, which may transmit at least a portion of the axial load to the FSW tool 200.

Figure 4:
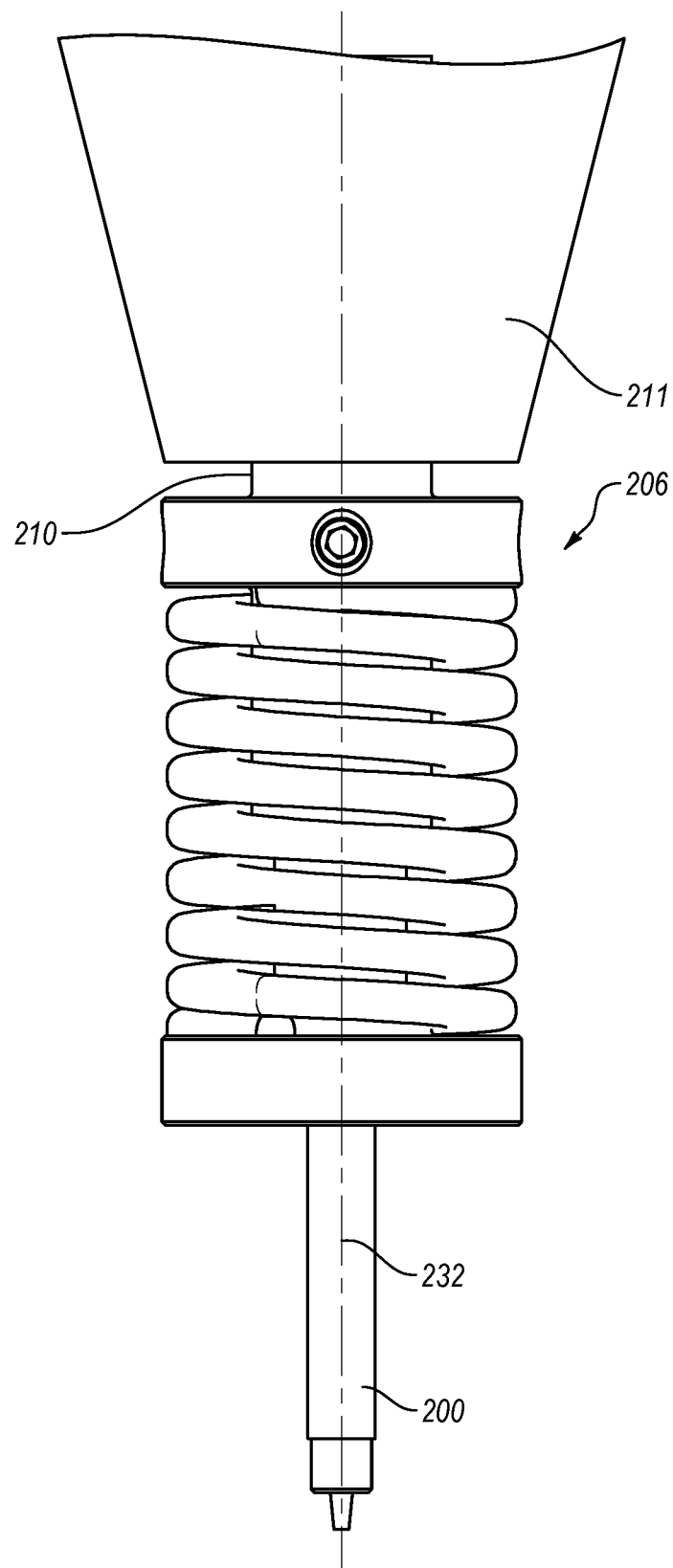
FIG. 4 is a side view of the embodiment of a load head of FIG. 2 held by a tool holder, according to some embodiments of the present disclosure.

Referring now to FIG. 4, a side view of the embodiment of a load head 206 of FIG. 3-1 is shown held in a CNC machine tool holder 211 by the arbor 210. The CNC machine tool holder 211 grips the load head 206 by the arbor 210 and may manipulate the load head 206 through at least a z-axis and about a rotational axis 232 of the CNC machine tool holder 211. In some embodiments, the CNC machine tool holder 211 may move the load head 206 through six degrees of freedom (e.g., translation in the x-direction, y-direction, and z-direction, and rotation about the x-axis, y-axis, and z-axis).

Figure 5:
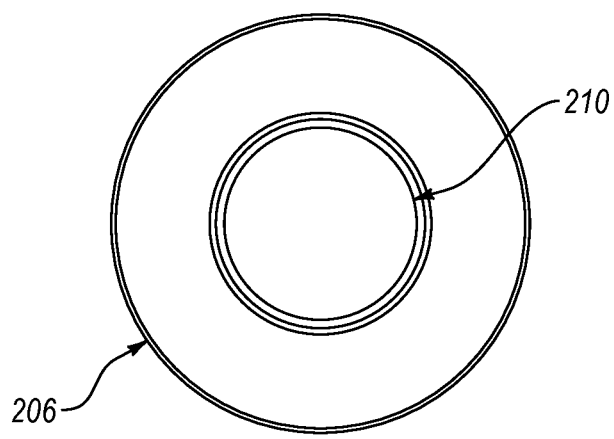
FIG. 5 is a top view of the embodiment of a load head of FIG. 2, according to some embodiments of the present disclosure.

The load head 206 is connected to the CNC machine tool holder 211 by the arbor 210 shown in the top view of the embodiment of the load head 206 in FIG. 5. The arbor 210 is shown as having a circular transverse cross-section. In other embodiments, the arbor 210 may have another transverse cross-section such as, for instance, to facilitate the transmission of torque through the arbor 210 to the load head 206. For example, the transverse cross-section of the arbor 210 may be elliptical, irregularly curved, square, hexagonal, octagonal, other polygonal, irregular, or combinations thereof to allow a connection with the CNC milling device to torque the load head 206.

Figure 6:
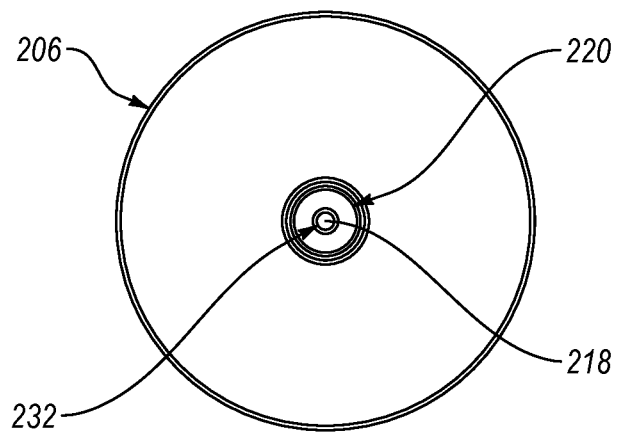
FIG. 6 is a bottom view of the embodiment of a load head of FIG. 2, according to some embodiments of the present disclosure.

FIG. 6 is a bottom view of the FSW tool 200 (i.e., a view toward the FSW tool 200 and the load head 206 from the perspective of the workpieces being welded by the FSW tool 200). As shown in FIG. 6, the pin 218 and shoulder 220 may be centered on the longitudinal and/or rotational axis 232 of the load head 206. Centering the pin 218 and shoulder 220 on the rotational and/or longitudinal axis 232 of the load head 206 allows the load head 206 to transmit torque and/or axial loads from the CNC milling device to the FSW tool 200 and/or workpieces. As a result, in some embodiments, the relative position of the piston and the cylinder, or other first bodies and second bodies of the load head 206, to the FSW tool 200 may have little to no effect on the application of the force to the FSW tool 200.

Additionally, in some embodiments, the load head 206 may be rotationally balanced about the rotational axis 232. As a result, rotation of the load head 206 at high rates (e.g. rotational rates above 500 revolutions per minute (RPM), above 1000 RPM, above 2000 RPM, or higher) may not imbalance the load head 206 or the attached CNC milling device.

Figure 7:
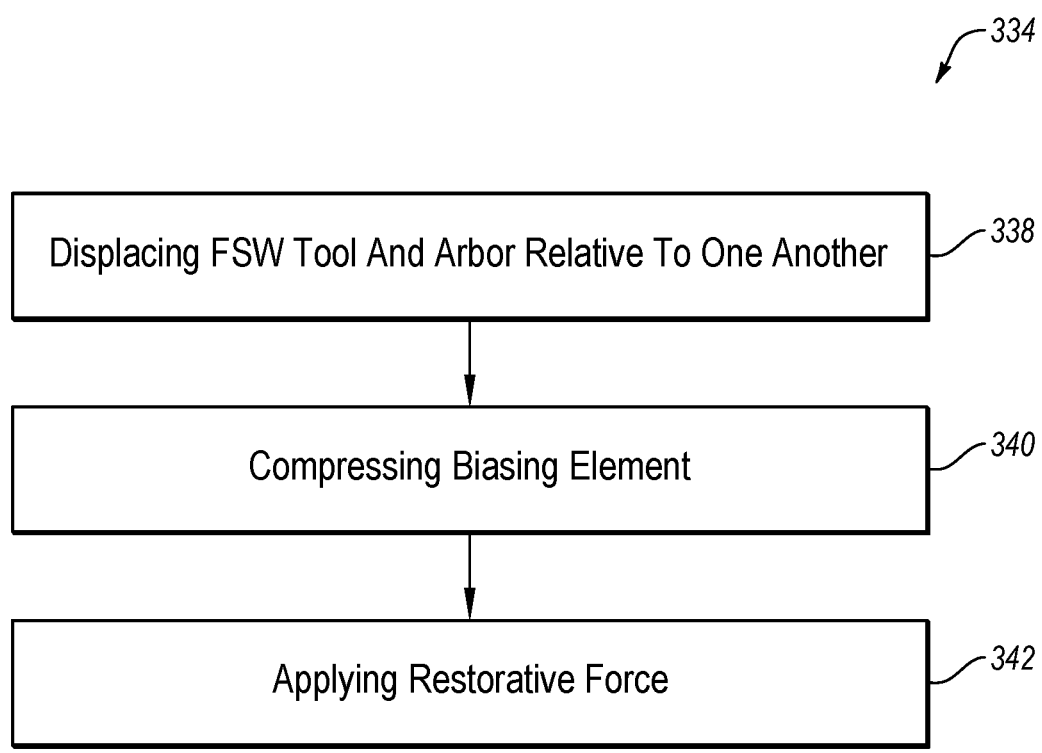
FIG. 7 is a flowchart illustrating an embodiment of a method of friction stir welding, according to some embodiments of the present disclosure.

FIG. 7 illustrates a flowchart of an embodiment of a method 334 of joining a first workpiece to a second workpiece. In some embodiments, the method 334 may be used with a rotatable load head including a FSW tool and an arbor. Optionally, the arbor may be used in conjunction with a CNC milling device that is capable of at least z-axis movement and rotational movement about a rotational axis. The method 334 includes axially displacing a FSW tool connected to the load head and an arbor of the load head toward one another in an axial direction. For instance, displacing 338 the FSW tool and arbor of the load head may include axially moving the FSW tool and a first body of the load head relative to the arbor and a second body of the lead head. Axial movement may be result in the FSW tool moving either away from, or toward, the arbor. In some embodiments, the FSW tool and the arbor may be displaced relative to one another by contacting the FSW tool with one or more workpieces. For example, the FSW tool may contact the workpiece(s) to be joined, and the CNC milling device holding arbor may continue to move the arbor toward the workpiece. The axial force applied by the CNC milling device to the arbor may displace the arbor toward the FSW tool.

In some embodiments, axially displacing the FSW tool (e.g., moving the FSW tool toward the arbor) may, directly or indirectly, result in compressing a biasing element of the load head at 340. Optionally, the biasing element may be configured to bias the FSW tool in an axial direction relative to the arbor (e.g., biases the FSW tool away from the arbor).

In some embodiments, compressing the biasing element at 340 may result in, or be accompanied by, the biasing element applying a restorative force in an opposite direction to the compression at 342. For example, the biasing element may include a compressible fluid, such as in a hydraulic or pneumatic cylinder, or may include a resilient member, such as a bushing or a spring. The biasing element may apply the restorative force at 342 according to a linear response to the displacement, such as according to Hooke's law. In other example embodiments, the biasing element may exhibit a non-linear response to the compression. For instance, an exponential response to the compression may be generated during interaction with a magnetic field.

In some embodiments, displacing the FSW tool and the arbor of the load head at 338 may include displacing the FSW tool a first distance relative to the arbor, and compressing the biasing element at 340 may include reducing a length of the biasing element the same first distance. In other embodiments, the biasing element may be oriented at an angle or may include one or more mechanical or fluid connections such that displacing the FSW tool and the arbor of the load head a first distance at 338 includes, or is followed by compressing the biasing element at 340 by a second distance that is greater than or less than the first distance.

In some embodiments, the restorative force may apply the axial force to the FSW tool during a FSW operation in which the first workpiece is joined to the second workpiece. Rotating the arbor may rotate the first body and second body of the load head. The load head may transmit the torque from the arbor to the FSW tool to rotate the FSW tool relative to the first workpiece and second workpiece to FSW the workpieces together. A user may apply a known axial force during FSW by moving the arbor relative to the FSW tool.

Figure 8:
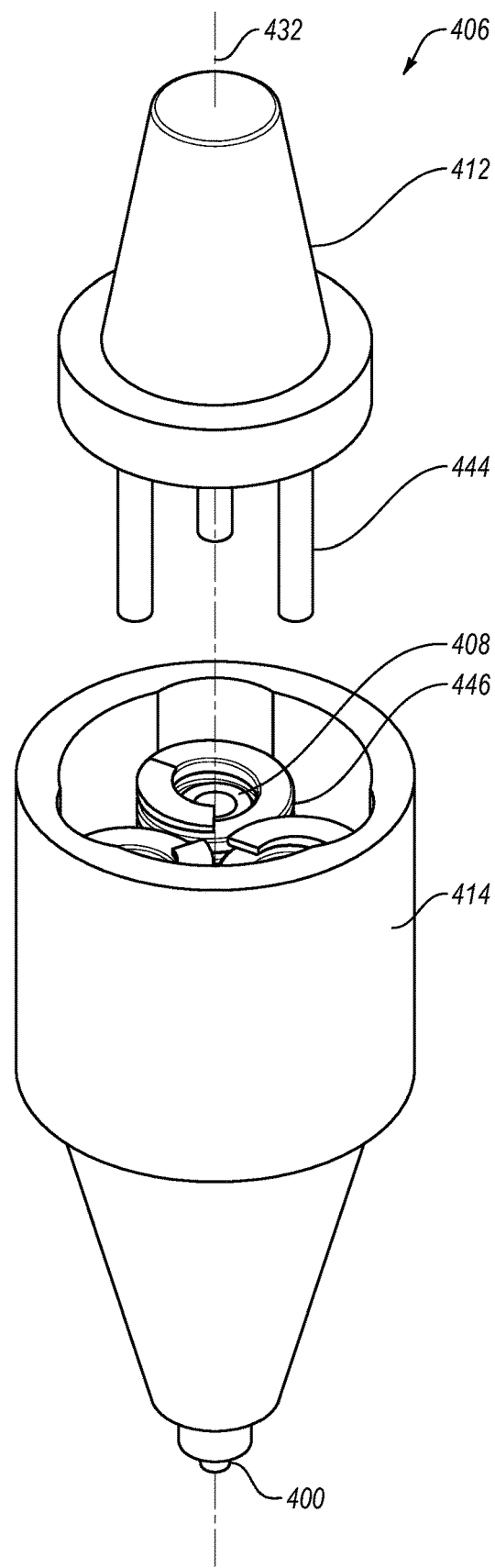
FIG. 8 is an exploded perspective view of another embodiment of a load head, according to some embodiments of the present disclosure.

FIG. 8 is an exploded view of another embodiment of a load head 406 according to the present disclosure. In some embodiments, a load head may include a plurality of biasing elements 408 to apply a restorative force upon compression. Embodiments with a plurality of biasing elements (e.g., biasing elements 408) may allow higher spring constants and/or restorative forces per volume (e.g., within the same space) than embodiments of a load head with a single biasing element, such as described in relation to FIG. 2 through FIG. 7. For example, the biasing elements may include a spring, such as a coil spring, as shown in FIG. 8. In some embodiments, the biasing element 408 may include a leaf spring, a Belleville spring, other types of springs, or combinations thereof.

In other embodiments, the biasing element 408 may include a compressible fluid, such as a liquid, a gas, or combinations thereof. For example, a compressible fluid may be positioned within a piston and cylinder such that displacement of the piston toward the cylinder compresses the fluid, increasing the fluid pressure of the fluid while decreasing the volume of the fluid. In yet other embodiments, the biasing element 408 may include a plurality of magnets that utilize the interaction of the magnetic fields to generate a restorative force. In further embodiments, the biasing element 408 may include or be a resilient solid, such as rubber, polyurethane, or other polymer. For example, the biasing element 408 may include or be one or more polymer bushings positioned longitudinally between at least part of the first body of the load head and at least part of the second body of the load head. In yet further embodiments, the biasing element 408 may include a combination of the foregoing. For example, a spring may be coiled around a piston and cylinder with a compressible fluid positioned therein.

In some embodiments, a load head 406 may have a rotational axis 432 about which the load head 406 may rotate during FSW operations. A FSW tool 400 may be aligned with the rotational axis 432 and rotationally fixed relative to at least a portion of the load head 406 such that rotation of the load head 406 rotates the FSW tool 400. In some embodiments, the load head 406 may have a first body 412 and second body 414 that are longitudinally (i.e., in the direction of the rotational axis 432) displaceable relative to one another. For example, the plurality of biasing elements 408 may be positioned between at least part of the first body 412 and at least part of the second body 414 such that longitudinal displacement of the first body 412 toward the second body 414 may longitudinally compress the plurality of biasing elements 408.

In some embodiments, at least one biasing element 408 of the plurality of biasing elements 408 may be displaced in a perpendicular direction perpendicular to the rotational axis 432. For example, FIG. 8 illustrates an embodiment of a load head 406 with three biasing elements 408 positioned around the rotational axis 432. Each of the biasing elements 408 is displaced in a perpendicular direction from the rotational axis 432. In other embodiments, one or more of the biasing elements 408 may be concentric with the rotational axis 432. In other words, at least one of the biasing elements 408 may have a longitudinal axis that is coaxial with the rotational axis 432, such that the biasing element 408 rotates about the rotational axis 432, such as in the embodiments described in relation to FIG. 2-7. In such embodiments, additional biasing elements 408 may be positioned displaced from the rotational axis 432.

In some embodiments, the biasing elements 408 of the plurality of biasing elements 408 that are displaced in a perpendicular direction may be positioned around the rotational axis 432 at angular intervals. For example, FIG. 8 illustrates an embodiment of a load head 406 with three biasing elements 408 positioned at equal 120° intervals about the rotational axis 432. In other examples, the angular intervals may be other equal angular intervals dependent upon the quantity of biasing elements, such as two 180° angular intervals, four 90° angular intervals, six 60° angular intervals, or other equal angular intervals. In other embodiments, at least some of the biasing elements 408 may be positioned at unequal angular intervals around the rotational axis 432. For example, three biasing elements may be positioned with 110°, 120°, and 130° angular intervals, respectively, between the biasing elements 408.

In some embodiments, the first body 412 and second body 414 may be rotationally fixed around the rotational axis 432 relative to one another. For example, the first body 412 and second body 414 may have at least one mechanical interlock such that rotation of the first body 412 translates to rotation of the second body 414. In other examples, at least a portion of the first body 412 may be welded to the second body 414. In yet other examples, a portion of the first body 412 may be connected to the second body 414 by a fastener, such as a pin, threaded rod, bolt, clip, clamp, etc.

The embodiment illustrated in FIG. 8 includes a mechanical interlock between the first body 412 and the second body 414. In some embodiments, the mechanical interlock may include one or more protrusions 444 that may be received in one or more recesses 446. For example, the protrusions 444 may be rods that protrude in a longitudinal direction from the first body 412, and the recesses 446 may be cylinders with a longitudinal opening that receive the rods. The rod-and-cylinder interaction may transmit rotational movement while allowing longitudinal displacement of the first body 412 and the second body 414. Regarding FIG. 9, the protrusion 444 may include a stop surface 444A and the recess 446 may include a stop surface 446A. The stop surfaces 444A, 446A may extend transverse to the rotational axis 432 and limit axial movement of the first body 412 and the second body 414. In other embodiments, the protrusion 444 and recess 446 interlock may be a radial protrusion and radial recess, such as the set screw 222 and recess 224 of FIG. 3A, that may transmit rotational movement while allowing longitudinal displacement of the first body 412 and the second body 414.

Figure 9:
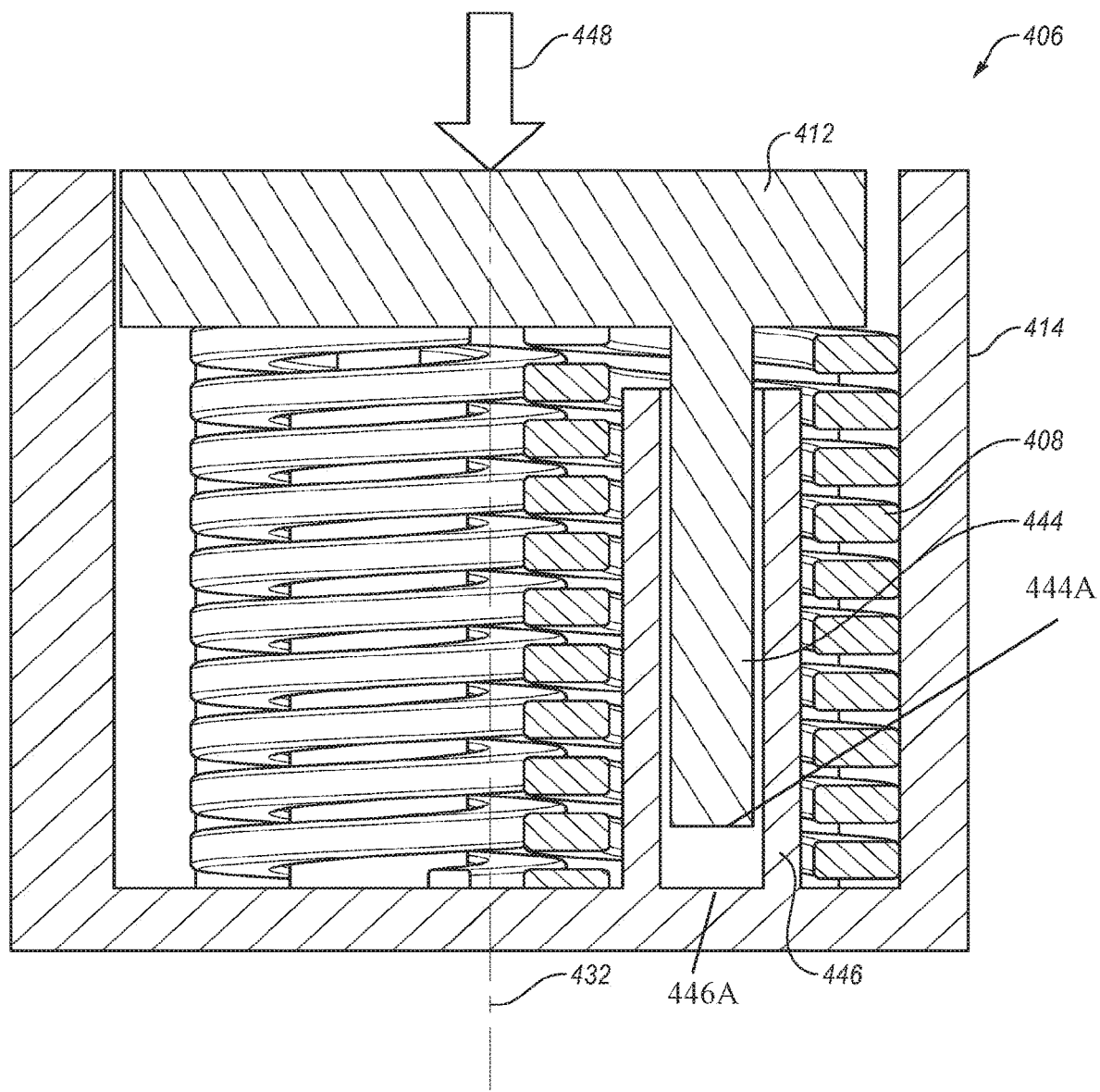
FIG. 9 is a side cross-sectional detail view of the embodiment of a load head of FIG. 8, according to some embodiments of the present disclosure.

FIG. 9 is a side cross-sectional view of a portion of the embodiment of a load head 406 shown in FIG. 8. The first body 412 may receive an axial force 448 from a tool holder (such as a CNC milling system) that compresses the plurality of biasing elements 408. The protrusions 444 may move in a longitudinal direction relative to the recesses 446 during the compression of the biasing elements 408.

In some embodiments, one or more of the biasing elements 408 may receive at least a portion of the protrusion 444 and/or provide at least a portion of the mechanical interlock. For example, the biasing elements 408 may be coil springs through which at least a portion of the protrusion 444 may be positioned. In other examples, such as the embodiment depicted in FIG. 10, the protrusion 544 and recess 546 of a load head 506 may be a piston and a cylinder, respectively, whereby the piston is connected to one of the first body 512 or second body 514, and the cylinder is connected to the other of the first body 512 or second body 514. A compressible fluid 550 may be positioned between at least part of the piston and cylinder to produce a restorative force 552 in response to an axial force 548 applied to the first body 512. The restorative force 552 may urge the first body 512 and second body 514 longitudinally apart, transmitting at least some of the axial force 548 from the first body 512 to the second body 514.

Figure 10:
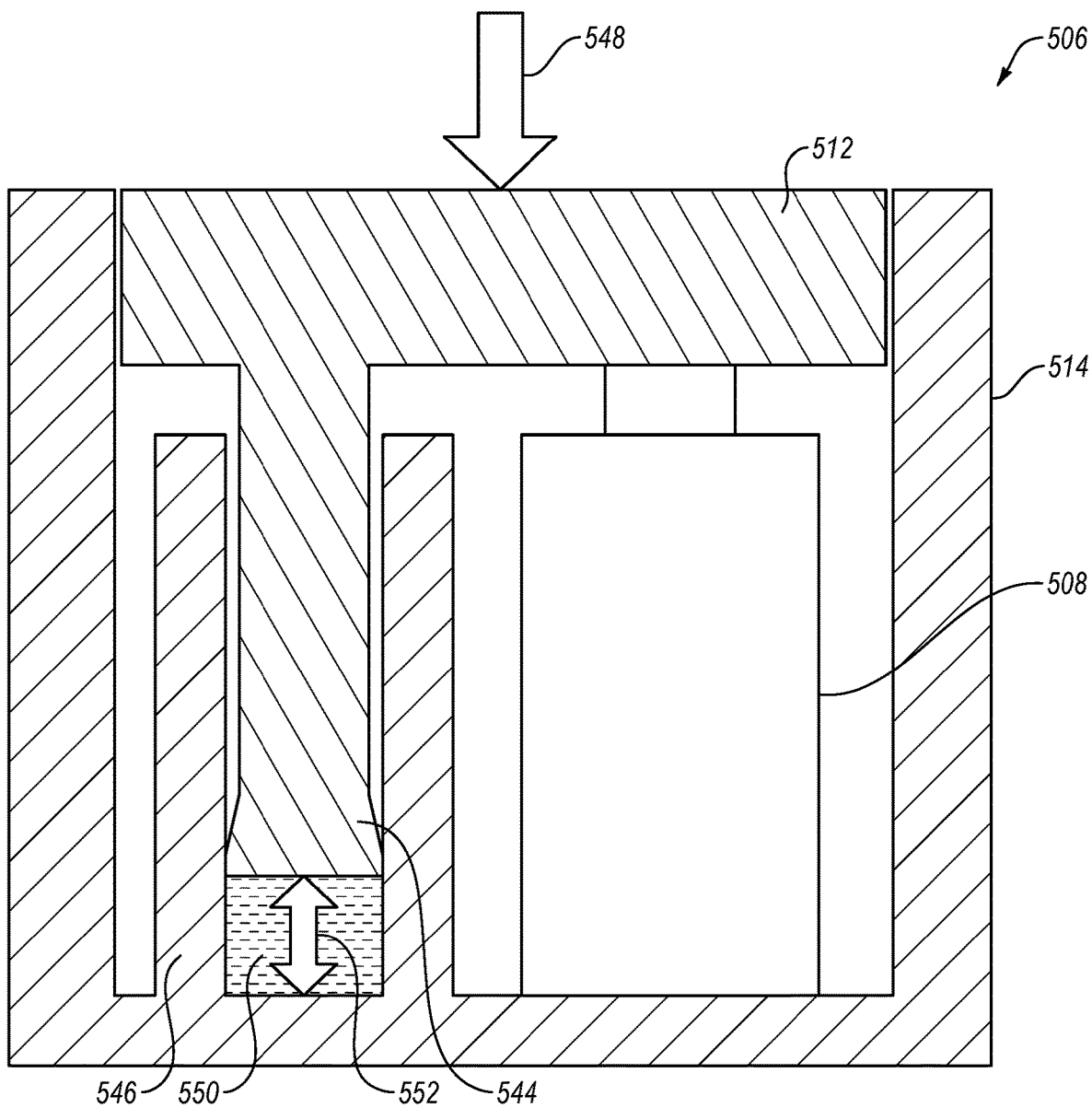
FIG. 10 is a side cross-sectional detail view of another embodiment of a load head, according to some embodiments of the present disclosure.

In some embodiments, one or more of the biasing elements may be selectively adjustable or replicable to modify the spring constant and/or restorative force of the load head. For example, one or more of the coil spring biasing elements illustrated in FIGS. 8 and 9 may be selectively replaceable to adjust the response of the load head to compression. In other examples, a piston and cylinder biasing element, such as shown in FIG. 10, may be adjusted by altering the composition or pre-load of the compressible fluid in the biasing element. In yet other examples, the piston and cylinder biasing element may be a sealed component that is selectively replaceable to adjust the response of the load head to compression.

For example, a load head having a plurality of biasing elements may provide a restorative force (i.e., a spring constant) according to 250 lbs of force (1.11 kilonewtons) for each 0.001 inches (25.4 micrometers) of compression. Changing the biasing elements, either by replacing the biasing elements or by adjusting a compressible fluid or other component of the biasing elements, the restorative force may be increased or decreased.

Figure 11:
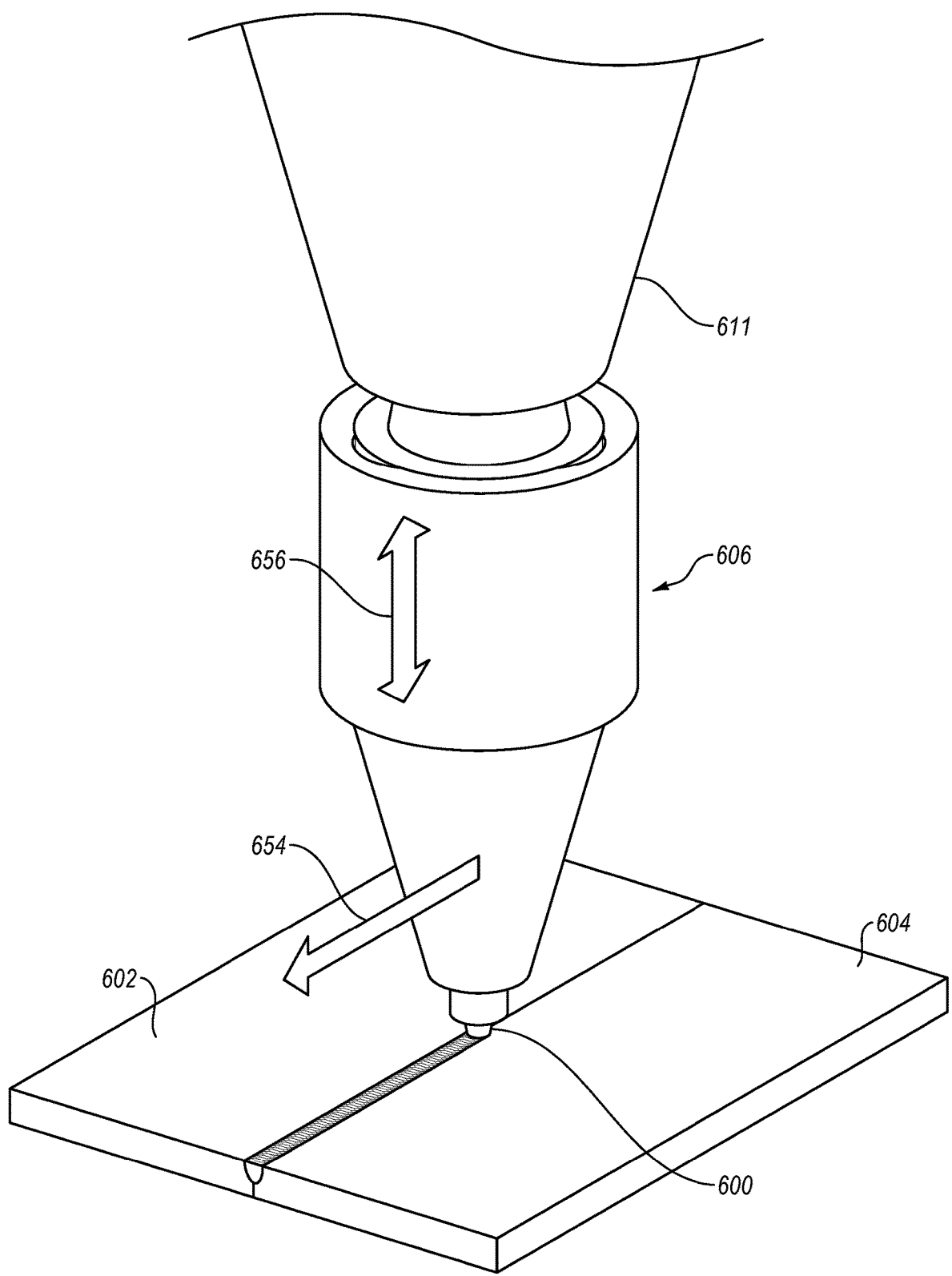
FIG. 11 is a perspective view of an embodiment of a load head friction stir welding a joint, according to some embodiments of the present disclosure.

FIG. 11 is a perspective view of an embodiment of a load head 606 in a CNC machine tool holder 611 joining a first workpiece 602 and a second workpiece 604 by FSW. During FSW, the translational movement of the FSW tool 600 across the joint may apply a drag force 654 on the load head 606. The drag force 654 may apply a torque to the load head 606 to tilt or bend the load head 606 relative to the CNC machine tool holder 611. A load head 606 having a plurality of biasing elements, at least some of which are displaced in perpendicular direction to a rotational axis, may compress a first biasing element of the plurality of biasing elements more than a second biasing element of the plurality of biasing elements. The differential compression of the biasing elements may better resist the torque applied by the drag force 654 by applying a restorative torque 656 to counteract the tilt and/or bend of the load head 606.

As described herein, the restorative force applied by a biasing element according to the present disclosure may vary depending on the compression. Small variations in the orientation of the biasing elements may result in an unintended variation in the restorative force. Perpendicularly displaced biasing elements may, therefore, limit and/or prevent a bend or tilt of the load head 606 due to drag force 654. A more vertical load head 606 may provide a more predictable restorative force, and hence axial load, during FSW operations.

Figure 12:
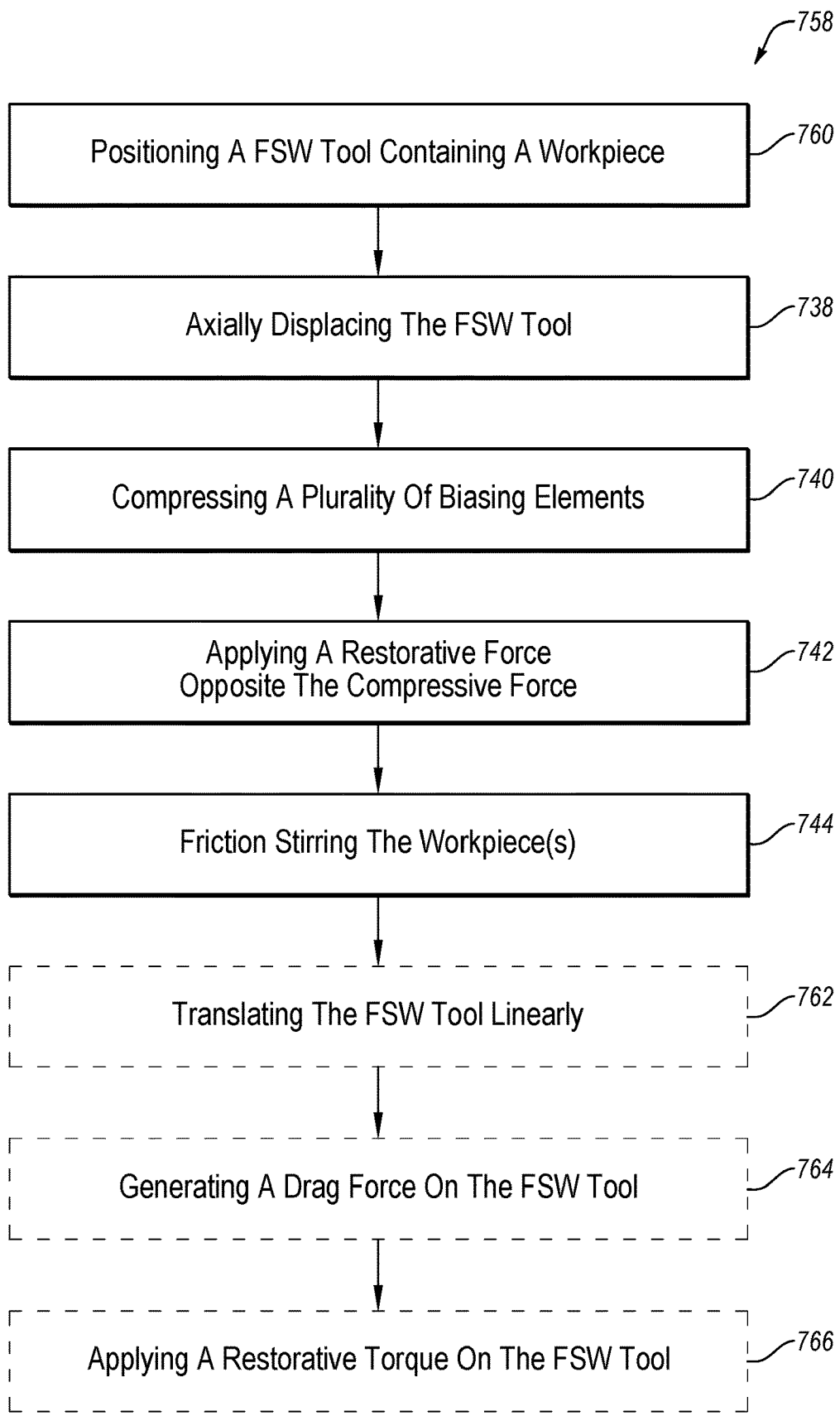
FIG. 12 is a flowchart illustrating another embodiment of a method of friction stir welding, according to some embodiments of the present disclosure.

FIG. 12 is a flowchart illustrating an embodiment of a method 758 of friction stirring a workpiece, according to the present disclosure. While friction stir welding of butt joints has been described in relation to FIG. 1 and FIG. 11, it should be understood that friction stirring, as used herein, may describe friction stir welding of butt joints, lap joints, or other joint configurations; friction stir joining of spot locations; friction stir riveting; and friction stir processing of a workpiece to refine the grain structure of the workpiece.

In some embodiments, the method 758 may be used with a rotatable load head including a FSW tool and an arbor, similar to the embodiment of a method 334 described in relation to FIG. 7. Optionally, the arbor may be used in conjunction with a CNC milling device that is capable of at least z-axis movement and rotational movement about a rotational axis. The method 758 includes positioning a FSW tool and load head according to the present disclosure, contacting a workpiece or workpieces at 760. The method 758 further includes axially displacing a FSW tool connected to the load head and an arbor of the load head toward one another in an axial direction at 738. For instance, displacing the FSW tool and arbor of the load head may include axially moving the FSW tool and a first body of the load head relative to the arbor and a second body of the lead head. Axial movement may be result in the FSW tool moving either away from, or toward, the arbor. In some embodiments, the FSW tool and the arbor may be displaced relative to one another by contacting the FSW tool with one or more workpieces. For example, the FSW tool may contact the workpiece(s), and the CNC milling device holding arbor may continue to move the arbor toward the workpiece. The axial force applied by the CNC milling device to the arbor may displace the arbor toward the FSW tool.

In some embodiments, axially displacing the FSW tool (e.g., moving the FSW tool toward the arbor) may, directly or indirectly, result in compressing a plurality of biasing elements of the load head at 740. Optionally, the plurality of biasing elements may be configured to bias the FSW tool in an axial direction relative to the arbor (e.g., biases the FSW tool away from the arbor).

In some embodiments, compressing the plurality of biasing elements at 740 may result in, or be accompanied by, the plurality of biasing elements applying a restorative force in an opposite direction to the compression at 742. For example, the plurality of biasing elements may include a compressible fluid, such as in a hydraulic or pneumatic cylinder, or may include a resilient member, such as a bushing or a spring. The plurality of biasing elements may apply the restorative force at 742 according to a linear response to the displacement, such as according to Hooke's law. In other example embodiments, the plurality of biasing elements may exhibit a non-linear response to the compression. For instance, an exponential response to the compression may be generated during interaction with a magnetic field.

In some embodiments, displacing the FSW tool and the arbor of the load head at 738 may include displacing the FSW tool a first distance relative to the arbor, and compressing the plurality of biasing elements at 740 may include reducing a length of the plurality of biasing elements the same first distance. In other embodiments, the plurality of biasing elements may be oriented at an angle or may include one or more mechanical or fluid connections such that displacing the FSW tool and the arbor of the load head a first distance at 738 includes, or is followed by compressing the plurality of biasing elements at 740 by a second distance that is greater than or less than the first distance.

In some embodiments, the restorative force may apply the axial force to the FSW tool during a friction stirring operation. Rotating the arbor may rotate the first body and second body of the load head. The load head may transmit the torque from the arbor to the FSW tool to rotate the FSW tool relative to the workpiece(s) and plasticize and friction stir the workpiece(s). A user may apply a known axial force during FSW by moving the arbor relative to the FSW tool.

The method 758 may further include translating the FSW tool in a linear direction across the surface of the workpiece(s) at 762. The translation across the surface may generate a drag force at 764. The drag force may impart a tilt and/or bend of the load head (e.g., deflecting the rotational axis) that may result in a differential compression of the plurality of biasing elements (e.g., compressing one of the biasing elements more than another biasing element). The differential compression may cause the plurality of biasing elements to apply a restorative torque on the FSW tool and load head at 766, counteracting at least a portion of the tilt and/or bend due to the drag force.

In some embodiments, a load head and FSW tool of the present disclosure provides an adapter to convert a conventional CNC milling device to a device capable of performing FSW or other frictional joining techniques. The biasing element of the load head both allows for a predetermined axial force to be applied to the workpieces and allows the FSW tool to "float" on the workpieces and adjust small amounts in the axial direction upon encountering variations in the workpiece surfaces. Converting a conventional CNC milling device for friction stir welding of workpieces allows additional functionality for existing CNC milling devices, expands accessibility of FSW and other frictional joining techniques, and reduces the cost of FSW.

It is to be understood that the foregoing disclosure provides many different embodiments, or examples, for implementing different features. Specific examples of combinations and arrangements are described to simplify the disclosure. These are, of course, merely examples and are not intended to be limiting.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Components that are integrally formed should also be considered to be coupled together. Terms such as up, down, top and bottom, and other like terms indicating relative positions to a given point or element may have been utilized to more clearly describe some elements. These terms are relative to a reference point such as the surface from which joining operations are initiated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A tool having a longitudinal axis, the tool comprising:
a friction stir welding (FSW) tool;
a first body configured to be connected to a tool holder and rotated about the longitudinal axis;
a second body mounted to the first body and rotatable therewith about the longitudinal axis;
a plurality of projections of one of the first and second bodies slidably received in axially elongated recesses of the other of the first and second bodies, the projections and recesses configured to permit relative axial movement of the first and second bodies and fix the first and second bodies against relative rotational movement; and
stop surfaces of the projections and the recesses extending transverse to the longitudinal axis and limiting axial movement of the first and second bodies relative to one another;
a releasable connection between the second body and the FSW tool;
the second body axially and rotationally fixed relative to the FSW tool with the second body connected to the FSW tool so that the second body moves axially and rotationally together with the FSW tool; and
a plurality of biasing elements positioned longitudinally between at least a portion of the first body and at least a portion of the second body, the biasing elements applying a restorative force upon relative axial movement of the first and second bodies toward one another.

2. The tool of claim 1, wherein the first body is an arbor.

3. The tool of claim 1, wherein at least one of the biasing elements of the plurality of biasing elements comprises a spring.

4. The tool of claim 1, wherein at least one of the biasing elements of the plurality of biasing elements comprises a compressible fluid.

5. The tool of claim 1, wherein the projections include mechanical fasteners.

6. The tool of claim 1, wherein the first body and second body are rotationally fixed to the plurality of biasing elements.

7. The tool of claim 1, wherein at least two of the biasing elements of the plurality of biasing elements are rotationally fixed relative to one another.

8. The tool of claim 7, wherein the biasing elements of the plurality of biasing elements are at equal angular intervals around the longitudinal axis.

9. The tool of claim 1, at least one of the biasing elements of the plurality of biasing elements being displaced in a perpendicular direction relative to the longitudinal axis.

10. The tool of claim 1, at least one of the biasing elements of the plurality of biasing elements being selectively replaceable to adjust a restorative force of the tool.

11. The tool of claim 1 wherein the plurality of biasing elements include Belleville springs.

12. The tool of claim 1 wherein one of the first body and the second body includes an outer, tubular wall defining at least a portion of an interior cavity of the one of the first body and the second body; and
wherein the biasing elements are received at least partially in the cavity.

13. A friction stir welding (FSW) system, the system comprising:
a tool holder moveable at least in a longitudinal direction and rotatable about a rotational axis;
a FSW tool configured to rotate about the rotational axis; and
a load head configured to connect the FSW tool to the tool holder and rotate with the tool holder, the load head having a longitudinal axis and including:
a first body configured to be connected to the tool holder;
a second body mounted to the first body;
a plurality of projections of one of the first and second bodies slidably received in axially elongated recesses of the other of the first and second bodies, the projections and recesses configured to permit relative axial movement of the first and second bodies and fix the first and second bodies against relative rotational movement;
stop surfaces of the projections and the recesses extending transverse to the longitudinal axis and limiting axial movement of the first and second bodies relative to one another;
a releasable connection between the second body and the FSW tool;
the second body rotationally and axially fixed relative to the FSW tool with the second body connected to the FSW tool; and
a plurality of biasing elements positioned longitudinally between at least a portion of the first body and at least a portion of the second body.

14. The system of claim 13, wherein the first body is an arbor.

15. The system of claim 13, wherein the plurality of biasing elements responds to displacement of the first body and second body relative to one another according to Hooke's Law.

16. The tool of claim 13, wherein the stop surfaces are configured to abut and limit axial movement of the first and second bodies away from one another.

17. The tool of claim 13 wherein one of the first and second bodies includes an outer, tubular wall defining at least a portion of an interior cavity of the one of the first and second bodies; and
wherein the biasing elements and a portion of the other of the first and second bodies are in the interior cavity.

* * * * *